(12) United States Patent
Döller et al.

(10) Patent No.: US 12,194,578 B2
(45) Date of Patent: Jan. 14, 2025

(54) WELDING TORCH, WELDING SYSTEM, METHOD OF PRODUCING A WELDING TORCH AS WELL AS COMPUTER-READABLE MEDIUM

(71) Applicant: FRAMATOME GmbH, Erlangen (DE)

(72) Inventors: Alexander Döller, Gollhofen (DE); Christof Probst, Nuremberg (DE); Detlef Böge, Grimmen (DE)

(73) Assignee: FRAMATOME GmbH, Erlangen (DE)

(*) Notice: Subject to any disclaimer, the term of this patent is extended or adjusted under 35 U.S.C. 154(b) by 510 days.

(21) Appl. No.: 17/269,177

(22) PCT Filed: Aug. 22, 2018

(86) PCT No.: PCT/EP2018/072691
§ 371 (c)(1),
(2) Date: Feb. 17, 2021

(87) PCT Pub. No.: WO2020/038572
PCT Pub. Date: Feb. 27, 2020

(65) Prior Publication Data
US 2021/0276115 A1    Sep. 9, 2021

(51) Int. Cl.
*B23K 9/28* (2006.01)
*B23K 9/29* (2006.01)
*B33Y 80/00* (2015.01)

(52) U.S. Cl.
CPC .............. *B23K 9/285* (2013.01); *B23K 9/295* (2013.01); *B33Y 80/00* (2014.12)

(58) Field of Classification Search
CPC .... B23K 37/0241; B23K 9/167; B23K 9/285; B23K 9/287; B23K 9/295; B33Y 80/00

USPC ...................................................... 219/137.62
See application file for complete search history.

(56) References Cited

U.S. PATENT DOCUMENTS

| | | | |
|---|---|---|---|
| 3,109,916 A | 11/1963 | Kilburn et al. | |
| 4,986,002 A * | 1/1991 | Oros | B23K 9/287 33/354 |
| 5,916,465 A * | 6/1999 | New | B23K 9/323 219/136 |

(Continued)

FOREIGN PATENT DOCUMENTS

| | | |
|---|---|---|
| EP | 3017901 A1 | 5/2016 |
| GB | 1396506 A | 6/1975 |

OTHER PUBLICATIONS

Corresponding Search Report and Written Opinion for PCT/EP2018/072691.

*Primary Examiner* — Dana Ross
*Assistant Examiner* — James F Sims, III
(74) *Attorney, Agent, or Firm* — Davidson Kappel LLC

(57) ABSTRACT

A welding torch (18) for a welding system (10) includes a substantially spherical main body (20) that has an integrated coolant chamber (60) which is in fluid communication with at least one coolant port (62). The substantially spherical main body (20) is a joint head (22) of a ball joint (24) of the welding system (10). A welding system (10) includes a torch bracket (16) and the welding torch (18). The torch bracket (16) has a socket (26, 28) of a ball joint (24), and the socket (26, 28) receives the substantially spherical main body (20) of the welding torch (18) in a spherically orientable manner thereby forming the ball joint (24).

16 Claims, 6 Drawing Sheets

(56) References Cited

U.S. PATENT DOCUMENTS 9,731,385 B2 * 8/2017 Miller .................... B23K 9/167
2016/0121423 A1 5/2016 Hubinger et al.

* cited by examiner

WELDING TORCH, WELDING SYSTEM, METHOD OF PRODUCING A WELDING TORCH AS WELL AS COMPUTER-READABLE MEDIUM

FIELD OF THE DISCLOSURE

Embodiments of the present disclosure relate generally to a welding torch for a welding system as well as a welding system. Further, embodiments of the present disclosure relate generally to a method of producing a welding torch as well as a computer-readable medium.

BACKGROUND

In the state of the art, welding systems with welding torches are known which are used in many different technical applications.

Welding systems in general are known that are used to weld pipes at their inner or outer circumference. Therefore, the welding torch has to be moved along a circular path that corresponds to the shape of the pipe(s) to be welded. Hence, a certain flexibility with regard to the orientation of the welding torch is required such that the welding torch can be moved along the tube being the part to be welded. In the state of the art, the required flexibility of the welding torch is ensured by using a separately formed guiding component to which the welding torch is coupled in a movable manner so that the welding torch can be moved along a path predefined by the guiding component to reach different positions along that path. The path, however, is restricted by the guiding component being C-shaped, for instance, so that the predefined path is substantially adapted to the shape of the part to be welded, namely the pipe(s). In addition, this specific welding system is construed for welding pipes having a certain size.

Despite the specific requirements of certain application, general requirements exist that have to be taken into account. According to these general requirements, the size of the welding torch shall be reduced as much as possible while maintaining the welding characteristics of the welding torch. However, appropriate cooling of the welding torch is also required. In addition, electrical flashovers shall be avoided so that the risk of failures is reduced. Therefore, the welding torches are subjected to several restrictions with regard to their design in order to fulfill the different requirements.

Accordingly, it is a need for a welding system that improves the welding characteristics in a cost-efficient manner.

SUMMARY

Embodiments of the present disclosure provide a welding torch for a welding system, comprising a substantially spherical main body that has an integrated coolant chamber that is in fluid communication with at least one coolant port, and wherein the substantially spherical main body is a joint head of a ball joint of the welding system.

Accordingly, the welding torch with the substantially spherical main body provides a compact design of the welding torch. The spherical shape of the main body ensures that the risk of electrical flashovers is minimized during usage of the welding torch due to the specific shape of the welding torch, in particular its main body. As mentioned, the spherical shape of the main body relates to a minimized size of the overall welding torch. Therefore, the welding torch can be used in different applications or rather technical fields due to its minimized design. In fact, adaptions can be done easily so to ensure that the welding torch can be used for other applications.

The integrated coolant chamber further ensures that the welding torch can be cooled more efficiently so that the coolant flowing through the coolant chamber interacts with the hot area of the welding torch in a maximized area. Thus, the cooling effect is improved which in turn improves the welding characteristics.

Hence, the overall size of the welding torch is reduced while increasing the cooling capability simultaneously. In fact, the ratio of the overall volume of the welding torch with respect to the volume of the coolant chamber is reduced. Put it another way, the coolant chamber has a volume which fraction on the overall size of the welding torch is increased significantly.

In addition, the orientation of the welding torch can be set easily as the welding torch is part of a ball joint when it is held by a torch bracket of the welding system. Thus, the welding orientation of the welding torch can be adjusted easily as a substantially 360° rotation of the welding torch is possible. The welding torch can be moved along a partial spherical surface. In other words, the spherical shape of the main body improves the capability of the welding torch with regard to its orientation during welding since it can be orientated in a substantially spherical manner while being part of the ball joint provided by the welding system comprising the welding torch and the torch bracket. In fact, the flexibility is increased with regard to the usable positions for the welding torch. Due to the higher flexibility with regard to the positions reachable, the seam geometry of the welding achieved may be improved simultaneously. The spherical adjustment of the welding torch enables positioning the welding torch in each direction.

The welding torch, in particular its active portion, can be adjusted in an area corresponding to at least a surface of a sphere, for instance the entire surface of a sphere.

These improved characteristics of the welding torch, namely the minimized risk of electrical flashovers, the flexibility with regard to the welding orientation as well as the improved cooling capability, generally ensure that an improved welding process can be obtained when using the welding torch according to the present disclosure.

According to an aspect, the substantially spherical main body is manufactured additively by an additive manufacturing process, in particular by a 3D printing process. The substantially spherical main body may be manufactured by an additive manufacturing process in a cost-efficient and simple manner. This manufacturing technique allows to adapt the design of the welding torch to the needs in an appropriate and cost-effective way. In fact, the coolant chamber can be formed in an integrated manner so that the overall cooling function is improved. The cooling capability is improved as the additive manufacturing process allows to produce the substantially spherical main body with an internal geometry that is adapted to ensure best cooling properties. Since the welding torch may be manufactured by an additive manufacturing process, the welding torch can be replaced easily in case of a failure or a damage of the welding torch. In fact, spare parts can be manufactured easily.

Generally, the overall costs for the welding torch can be reduced, in particular with regard to the lifetime costs of the welding system.

In addition, the additive manufacturing process ensures that the welding torch, in particular a spare part, can be adapted with regard to new or adapted requirements. Hence, the respective welding torch can be redesigned easily so that it is adapted to the specific requirements while still ensuring the main aspects such as a substantially spherical main body with an integrated coolant chamber, for instance.

The additive manufacturing process ensures that completely new designs can be obtained compared to the ones known in the state of the art. In the state of the art, it was typically a tradeoff between the overall size of the welding torch and its cooling capability due to the conventional manufacturing techniques.

The relative volume of the coolant chamber, namely the volume of the coolant chamber compared to the overall volume of the main body, can be maximized due to the additive manufacturing process used for producing the welding torch according to the present disclosure. Hence, the main body substantially corresponds to a cooling body.

In fact, the increased (relative) volume of the coolant chamber ensured by the integrated coolant chamber with its maximized volume improves the welding performance since welding may be done with higher currents.

Moreover, the quality of the welding seam provided by the welding torch when used for welding may be improved as the thermal overloads (of a welding electrode) can be avoided effectively.

Another aspect provides that the coolant chamber has an outer wall defined by the substantially spherical main body. Therefore, the coolant chamber itself has at least an outer area being substantially spherical. This ensures that the overall welding torch can be cooled in an efficient manner since the space of the coolant chamber is maximized. In other words, the coolant chamber is limited by the outer wall of the spherical main body that has a substantially constant thickness. The respective thickness ensures the stiffness required for the welding torch.

According to another aspect, at least one welding gas supply channel is integrated in the main body. The welding gas is supplied via the at least one welding gas supply channel to a welding electrode of said welding torch that is used during the welding. Since the welding gas supply channel is also formed in the main body in an integrated manner, in particular during the additive manufacturing process, an optimized flow path can be obtained.

It would not be possible to obtain such an optimized flow path when using conventional manufacturing techniques due to the restrictions of these techniques with regard to internal structures. Thus, an overall compact welding torch is ensured having optimized cooling as well as gas supply capabilities.

For instance, the main body comprises a receptacle for a welding electrode, in particular wherein the receptacle and the gas supply channel are in fluid communication. The gas is forwarded via the gas supply channel to the receptacle that accommodates inter alia the welding electrode. When a voltage is applied to the welding electrode, an electric arc between the welding electrode and the part to be welded occurs that is used for welding. The gas supplied ensures that the weld pool, namely the melted material of the part to be welded, is protected against the atmosphere, in particular oxygen. Thus, oxidation can be avoided effectively. Moreover, the overall welding process can be maintained stable due to the gas. Therefore, the (welding) gas may also be called shielding gas. In fact, the receptacle is assigned to the hot area of the welding torch as it accommodates the welding electrode.

The welding electrode may be made of wolfram or rather tungsten.

An inert gas may be used as the welding gas, for instance argon or helium.

Hence, the welding torch may correspond to a so-called WIG welding torch or rather a so-called TIG welding torch.

Particularly, the receptacle is surrounded by the coolant chamber in a substantially circular manner, seen in a cross-sectional view intersecting the axis of the welding electrode perpendicularly. This ensures that the heat transfer from the electrical arc to the main body is minimized as the receptacle is directly surrounded by the coolant chamber wherein the coolant provided in the coolant chamber takes away the occurring heat efficiently. Particularly, the coolant chamber substantially encloses the receptacle (except for the end of the welding electrode used for welding which corresponds to an opening area). Hence, the substantially entire receptacle is cooled by the coolant flowing through the coolant chamber.

Another aspect provides that the welding electrode is inserted in the receptacle via a welding electrode carrier. Hence, the welding electrode can be positioned easily via the welding electrode carrier within the receptacle. The overall geometry of the welding torch is simplified since the welding electrode can be replaced easily.

According to an embodiment, a gas supply inlet, a coolant inlet and a coolant outlet are provided in an interface area of the main body. A single interface may be provided that corresponds to a connection interface since all relevant processing media are connected via the connection interface of the main body, namely the coolant as well as the gas.

In fact, the coolant may be water. Hence, the welding torch is a water-cooled one.

The coolant flows from the coolant inlet via the coolant chamber to the coolant outlet wherein occurring heat due to the welding is absorbed by the coolant and taken away from the main body so that the main body heats up lesser.

A further aspect provides that the main body is made of a metal and/or coated with an electrically isolating material. The electrically isolating material improves the resistance with regard to electrical flashovers. Furthermore, the metal used ensures that the welding torch, in particular its main body, provides the mechanical properties required, for instance a certain stiffness. In addition, high thermal and electrical conductivity is ensured while using the metal main body.

Embodiments of the present disclosure further provide a welding system comprising a torch bracket and a welding torch with a substantially spherical main body, in particular the welding torch as described above, wherein the torch bracket has a socket of a ball joint, and wherein the socket receives the substantially spherical main body of the welding torch in a spherically orientable manner thereby forming the ball joint. The ball joint established by the welding torch and the torch bracket ensures that the welding torch can be orientated in a substantially spherical manner so that different welding positions can be reached easily. The substantially spherical main body of the welding torch corresponds to the joint head of the ball joint interacting with the socket provided by the torch bracket.

An aspect provides that the torch bracket is also manufactured additively by an additive manufacturing process, in particular by a 3D printing process. Accordingly, the torch bracket may also be manufactured additively.

The torch bracket may have a substantially ring-shaped holding section, in particular a C-shaped holding section. The respective holding section inter alia establishes the socket.

A clamp member, for instance a ring-shaped or rather C-shaped clamp member, may be provided that directly interacts with the welding torch to maintain the welding torch in position. The clamp member may clamp the welding torch in a certain orientation set. Thus, the clamp member may also be part of the socket.

Fixation elements such as screws may be assigned to the holding section or rather the clamp member which may be fastened and unfastened so as to enable adjusting the position or rather the orientation of the welding torch, in particular its angular position.

While adapting the position or rather the orientation of the welding torch, the position or rather the orientation of the welding electrode is set simultaneously. In fact, the orientation or rather the position of the welding electrode can be set with regard to trailing or leading as well as left or right.

Particularly, a single connector is coupled with the welding torch, in particular an interface area of the welding torch. The single connector may comprise the respective ports interacting with the inlet(s) and the outlet in the interface area of the welding torch to supply the respective media such as welding gas and coolant.

Embodiments of the present disclosure further provide a computer-readable medium having computer-executable instructions adapted to cause an additive manufacturing device, in particular a 3D printer, to produce additively at least the welding torch as described above. The computer-readable medium ensures that the welding torch as described above can be manufactured in a cost-efficient manner. For instance, a 3D printer is controlled appropriately to generate the welding torch. Alternatively, the welding torch may be generated by selective laser melting (SLM), selective laser sintering (SLS) or other suitable additive manufacturing processes such as stereolithography (SL).

In addition, embodiments of the present disclosure provide a method of producing a welding torch, in particular a welding torch as described above, with the following steps:
- Providing an additive manufacturing device, in particular a 3D printer, and
- Controlling the additive manufacturing device to produce a substantially spherical main body of the welding torch while simultaneously forming a coolant chamber in the substantially spherical main body in an integral manner.

The respective method ensures that a welding torch is provided that has the characteristics as mentioned above. The advantages mentioned previously therefore also apply to the method in a similar manner. In fact, the substantially spherical body with the integrated coolant chamber provided by the manufacturing process ensures that a compact welding torch is provided. The respective welding torch can be used by any suitable welding system to position the welding torch in a desired manner.

In fact, the cooling properties of the welding torch are improved due to the integrated coolant chamber having a maximized volume that in turn improves the welding characteristics when using the welding torch manufactured appropriately.

The respective method of producing the welding torch may be adapted such that a welding torch as described above is produced. This means that the method may simultaneously generate a main body having an integrated coolant chamber, an integrated gas supply channel and/or an integrated receptacle for a welding electrode. All these (internal) components may be produced simultaneously so that the overall welding torch is provided without any post-processing. This reduces the costs for providing a respective welding torch significantly.

Furthermore, embodiments of the present disclosure provide a computer-readable medium having computer-executable instructions adapted to cause an additive manufacturing device, in particular a 3D printer, to produce a substantially spherical main body of the welding torch while simultaneously forming a coolant chamber in the substantially spherical main body in an integral manner, in particular to perform the method of producing a welding torch as described above. The computer-readable medium ensures that the method of producing the welding torch can be executed in a cost-efficient manner. For instance, a 3D printer is controlled appropriately to perform the method. Alternatively, the method corresponds to a selective laser melting (SLM) process, selective laser sintering (SLS) process or any other suitable additive manufacturing process.

The main body may be made of a copper alloy such as $CuNi_2SiCr$. For instance, the main body is manufactured by a selective laser melting (SLM) process.

The torch bracket may be made of PEEK. For instance, the torch bracket is manufactured by a selective laser sintering (SLS) process.

The welding system may further comprise a camera adapter assigned to the torch bracket. The camera adapter may comprise a mirror so that a camera assigned to the camera adapter is directed towards the welding torch, in particular the welding electrode.

The camera adapter may also be made of PEEK. Therefore, the camera adapter may also be manufactured by a selective laser sintering (SLS) process.

Moreover, a welding wire supply unit may be part of the welding system that supplies the welding wire towards the welding electrode of the welding torch.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
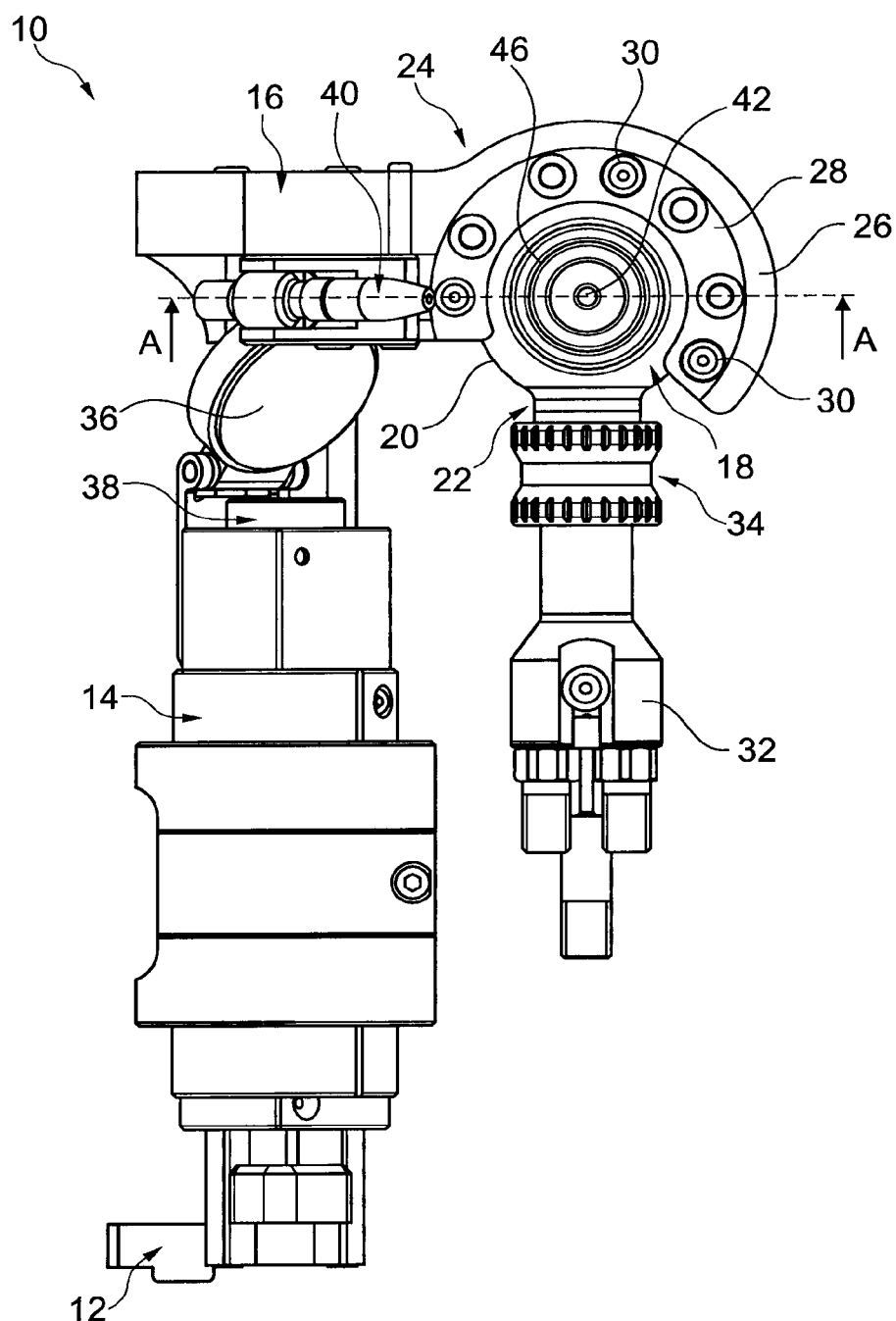
FIG. 1 shows a top view on a welding system according to an embodiment of the present disclosure.
Figure 2:
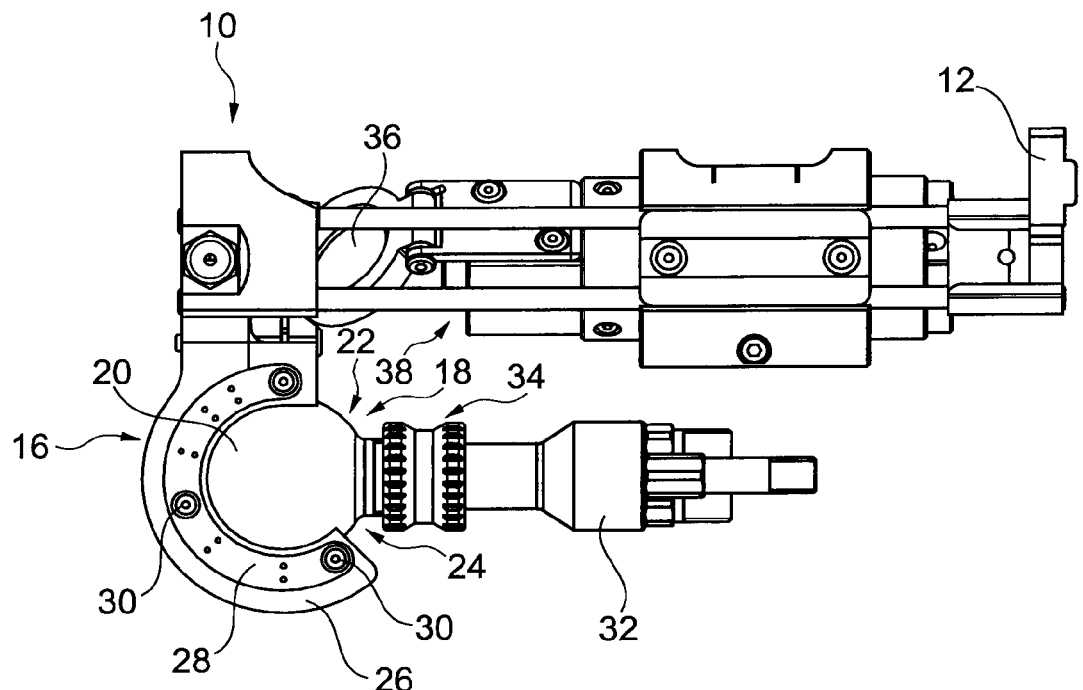
FIG. 2 shows a top view on the opposite side of the welding system shown in FIG. 1.
Figure 3:
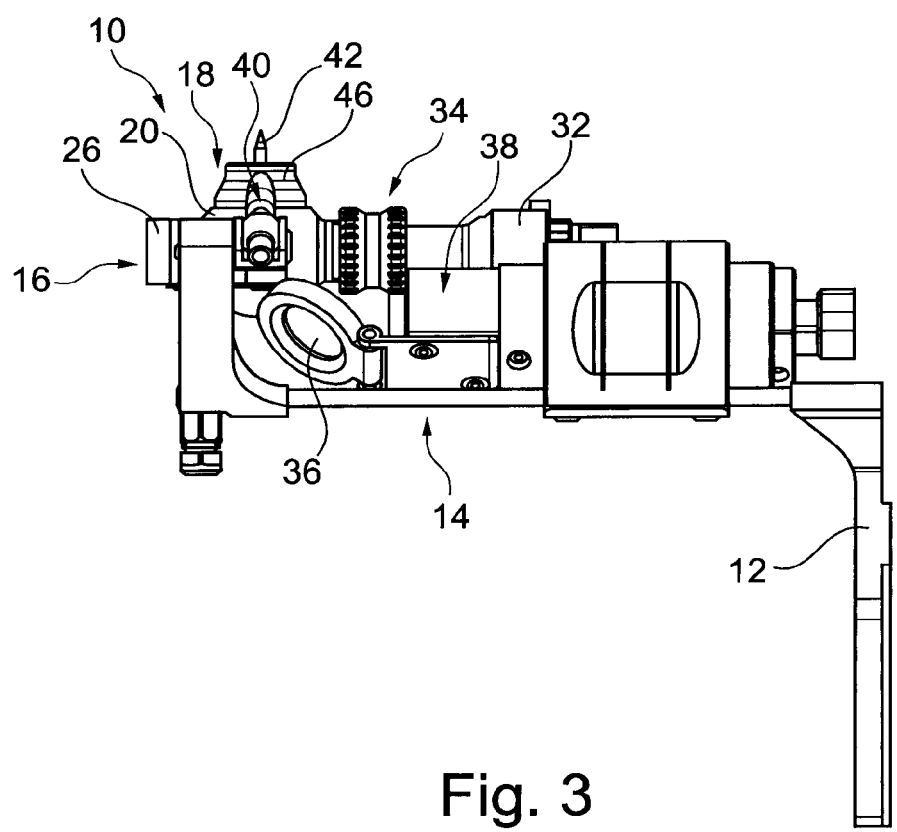
FIG. 3 shows a side view on the welding system of FIGS. 1 and 2.
Figure 4:
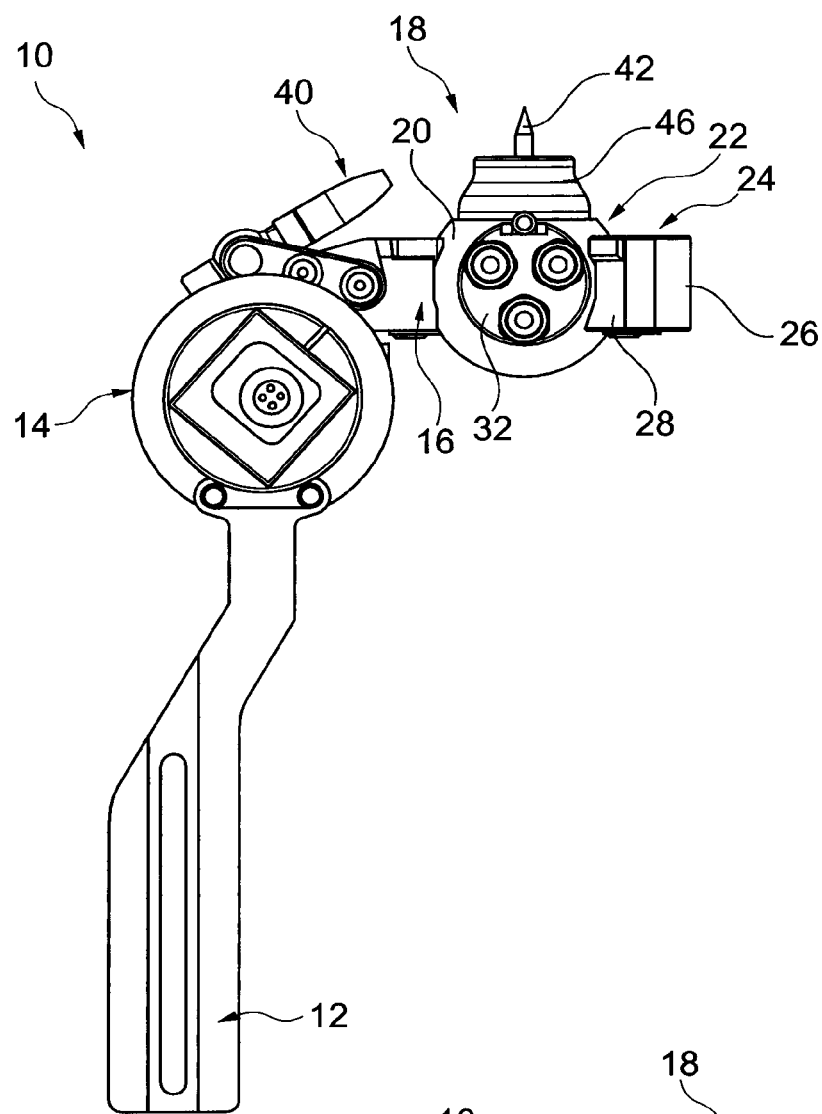
FIG. 4 shows a front view on the welding system of FIGS. 1 to 3.

In FIGS. 1 to 5, a welding system 10 is shown in different views. For instance, FIG. 1 is a top view on an upper side of the welding system 10.

The welding system 10 comprises a holder 12, a camera adapter 14 connected with the holder 12, a torch bracket 16 connected with the camera adapter 14 as well as a welding torch 18 that is held by the torch bracket 16.

Two embodiment of the welding torch 18 are shown in FIGS. 6 to 13 in different views as will be described later in more detail.

The welding torch 18 comprises a substantially spherical main body 20 that corresponds to a joint head 22 of a ball joint 24 of the welding system 10, which is established by the spherical main body 20 of the welding torch 18 as well as the torch bracket 16 itself.

The torch bracket 16 comprises a substantially ring-shaped or rather C-shaped holding section 26 that partially surrounds the spherical main body 20 as shown in FIG. 1.

The holding section 26 comprises a clamp member 28 that is also formed substantially ring-shaped or rather C-shaped wherein the clamp member 28 directly interacts with the welding torch 18, in particular the substantially spherical main body 20 of the welding torch 18.

In fact, the spherical main body 20 of the welding torch 18 is clamped in the clamp member 28 via fixation elements 30 such as screws that can be fastened and unfastened respectively to fixedly couple the welding torch 18 with the torch bracket 16.

Accordingly, the holding section 26 with the clamp member 28 together form a socket of the ball joint 24 that interacts with the substantially spherical main body 20 of the welding torch 18 so as to provide the flexible orientation of the welding torch 18.

Once, the fixation elements 30 have been unfastened or rather released, the orientation of the welding torch 18 can be adapted with respect to the torch bracket 16 so that the overall orientation of the welding torch 18 can be adapted in a substantially spherical manner. This substantially spherical adaption of the orientation is ensured by the substantially spherical main body 20 that is part of the ball joint 24 of the welding system 10.

Generally, the clamp member 28 ensures that the substantially spherical main body 20 is held tightly once the fixation elements 30 have been fastened after the welding torch 18 was positioned in the desired manner.

The orientation or rather position of the welding electrode 42 can be set with regard to trailing or leading as well as left or right. Hence, the orientation can be adapted in a substantially spherical manner.

In FIGS. 1 to 5 it is also shown that the welding system 10 comprises a single connector 32 that is coupled with the welding torch 18, in particular an interface area 34 of the welding torch 18. The interface area 34 will be described later with regard to FIGS. 6 to 13 referring to the welding torch 18.

Besides the components already mentioned above, the welding system 10 may also comprise a mirror 36 that is assigned to the camera adapter 14. In fact, the mirror 36 is assigned to a camera 38 wherein the field of view of the camera 38 is directed via the mirror 36 to the welding torch 18 so that the welding process can be observed during operation.

In addition, the welding system 10 has a welding wire supply unit 40 that is also assigned to the welding torch 18 so that a welding wire forwarded to the welding torch 18 via the welding wire supply unit 40 is used for welding purposes. The welding wire supply unit 40 may also be called wire nozzle.

The welding wire supply unit 40 or rather the wire nozzle is part of a welding wire supply system (not shown), in particular the end of the welding wire supply system.

The welding wire supply system typically also comprises a welding wire feed motor for feeding the welding wire to the welding wire supply unit 40 or rather the wire nozzle.

In general, the welding wire supply unit 40 or rather the wire nozzle is used to set the orientation and/or position where the welding wire reaches the weld pool, namely the melted material of the part to be welded.

The field of view of the camera 38 is also directed to the end of the welding wire supply unit 40 via the mirror 36. Hence, the welding wire position and/or the welding wire orientation can be observed during the welding.

In fact, the camera 38 ensures that the position and/or orientation of the welding electrode 42, in particular the relative position and/or orientation of the welding electrode 42 with respect to the part to be welded, the weld pool itself as well as the position and/or orientation where the welding wire reaches the weld pool may be observed during welding.

The position as well as the orientation of the mirror 36, the camera 38 and/or the welding wire supply unit 40 can be adapted by fastening and releasing fixation elements respectively.

Figure 5:
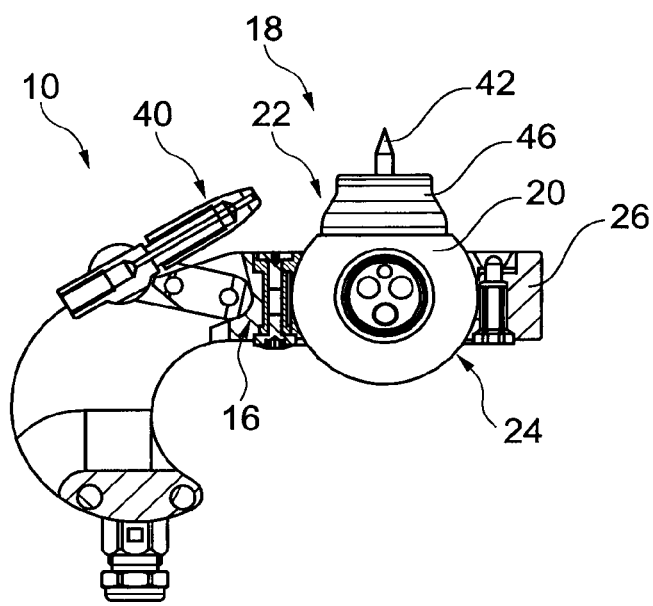
FIG. 5 shows a partial cross-sectional view along line A-A of FIG. 1.
Figure 6:
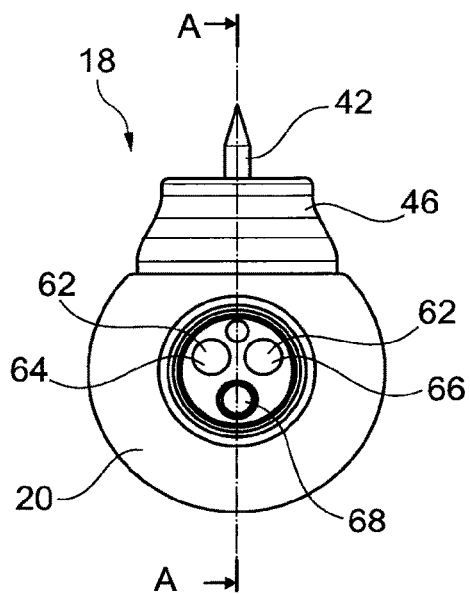
FIG. 6 shows a front view on a welding torch according to a first embodiment of the present disclosure.

In FIG. 5, a partial cross-sectional view along line A-A of FIG. 1 is shown wherein the welding torch 18 is not shown in a cross-sectional view for reasons of simplicity. The respective details of the welding torch 18 are shown in FIGS. 6 to 13 separately as will be discussed hereinafter.

Figure 7:
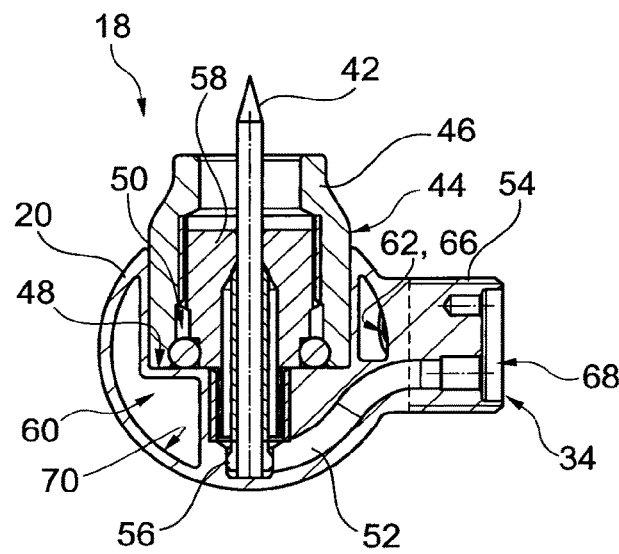
FIG. 7 shows a cross-sectional view along line A-A of FIG. 6.
Figure 8:
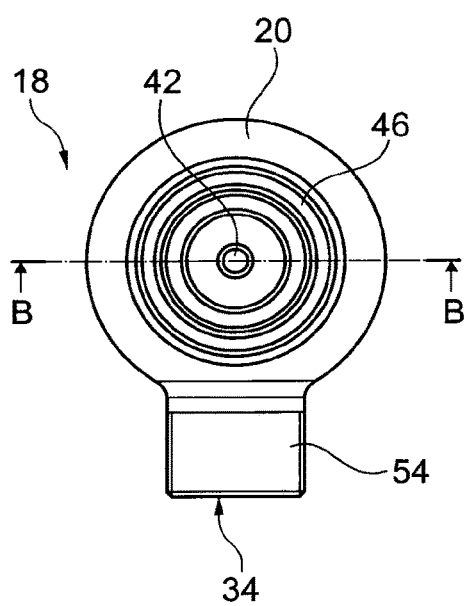
FIG. 8 shows a top view on the welding torch shown in FIG. 6.
Figure 9:
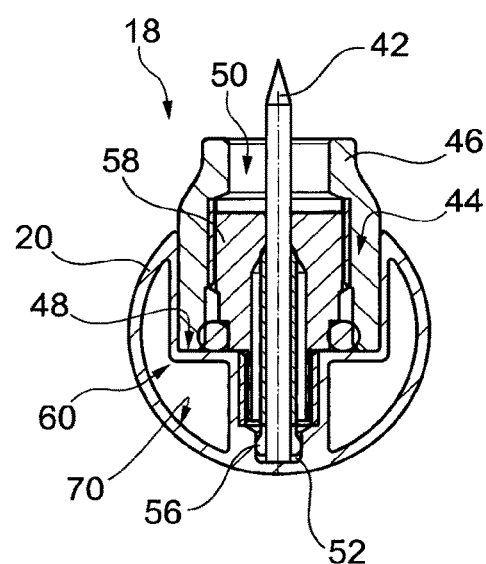
FIG. 9 shows a cross-sectional view along line B-B of FIG. 8.
Figure 10:
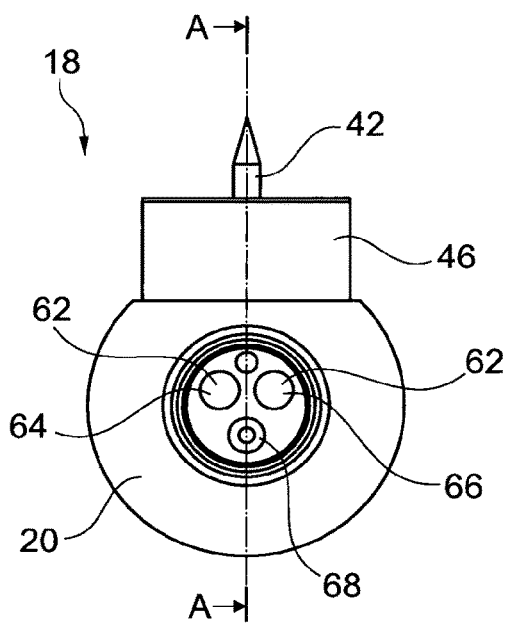
FIG. 10 shows a front view on a welding torch according to a second embodiment of the present disclosure.

In FIGS. 6 to 9, the welding torch 18 according to a first embodiment is shown in different views, namely a front view (FIG. 6), a top view (FIG. 8) as well as cross-sectional views (FIGS. 7 and 9).

The welding torch 18 comprises a welding electrode 42 as already shown in FIGS. 1 to 5. The welding electrode 42 is assigned to a receptacle 44 that accommodates the welding electrode 42 inter alia. The receptacle 44 is provided within the substantially spherical main body 20.

Further, a nozzle-like sleeve 46, also called gas nozzle, is provided that is accommodated in the receptacle 44 partially wherein the nozzle-like sleeve 46 surrounds the welding electrode 42 in parts. The nozzle-like sleeve 46 or rather gas nozzle may be used to direct the gas flow of the welding gas.

The nozzle-like sleeve 46 may be made of a dielectric material, for instance a ceramic.

The receptacle 44 is formed such that an abutting surface 48 for the nozzle-like sleeve 46 is provided on which the nozzle-like sleeve 46 rests.

The nozzle-like sleeve 46 surrounds a space 50 that is in fluid communication with a gas supply channel 52 that connects the space 50 with the interface area 34 of the welding torch 18 that is established at an extension 54 that disturbs the spherical shape of the main body 20.

A welding gas, for instance an inert gas, can be forwarded towards the weld pool or rather welding area via the connector 32 and the gas supply channel 52 that merges into the space 50 in which the welding electrode 42 is positioned so that the welding gas flows along the welding electrode 42 towards the weld pool or rather the welding area.

Accordingly, the gas supply channel 52 is integrated with in the substantially spherical main body 20.

In addition, a clamping sleeve 56 is provided that interacts with a clamping sleeve housing 58 that interacts with the clamping sleeve 56 and the nozzle-like sleeve 46. The clamping sleeve 56 and the clamping sleeve housing 58 may be part of a welding electrode carrier that carries the welding electrode 42 or rather holds the welding electrode 42 in a predefined position.

In fact, the nozzle-like sleeve 46 as well as the clamping sleeve housing 58 may have corresponding threads via which both components can be connected with each other.

Hence, the nozzle-like sleeve 46 is fixedly positioned within the substantially spherical main body 20 in particular the receptacle 44.

The welding electrode 42 is held by the clamping sleeve 56 and the clamping sleeve housing 58 that together form a carrier for the welding electrode 42.

Furthermore, FIGS. 6 to 9 reveal that the welding torch 18, in particular the substantially spherical main body 20, has an integrated coolant chamber 60 that is in fluid communication with at least one coolant port 62 provided by the interface area 34.

In fact, the integrated cooling chamber 60 is in fluid communication with a coolant inlet 64 as well as a coolant outlet 66, both being coolant ports 62. Hence, the integrated cooling chamber 60 is connected to the coolant ports 62, namely the coolant inlet 64 and the coolant outlet 66, via coolant channels.

At the same time, current strands may be integrated in the coolant channels, via which a welding current is conducted to the welding electrode 42 via the substantially spherical main body 20.

Therefore, a coolant, for instance water, can flow from the coolant inlet 64 through the coolant chamber 60 of the welding torch 18 towards the coolant outlet 66 to cool the main body 20 during welding.

In addition to the coolant ports 62, the interface area 34 also comprises a gas supply inlet 68 that is in fluid communication with the integrated gas supply channel 52.

The single connector 32 shown in FIGS. 1 to 4 provides respective ports to be connected with the respective coolant ports 62 or rather the gas supply inlet 68 so that the media required for welding are provided via the single connector 32.

It becomes obvious that the integrated gas supply channel 52 has an optimized flow path so that it is ensured that the welding gas reaches the weld pool in an optimized manner.

In addition, the integrated coolant chamber 60 is also established within the spherical main body 20 in an optimized manner since the coolant chamber 60 has an outer wall 70 defined by the spherical main body 20. Put in another way, the coolant chamber 60 is limited to the outer environment via the main body 20.

Therefore, the outer area of the coolant chamber 60 facing away from the welding electrode 42 or rather the receptacle 44 has a substantially spherical shape.

As shown in FIGS. 6 to 9, the volume of the main body 20 is reduced while simultaneously increasing the volume of the integrated coolant chamber 60. Thus, the volume ratio is maximized, namely the volume of the integrated coolant chamber 60 with regard to the volume of the main body 20.

In FIGS. 10 to 13, another embodiment of the welding torch 18 is shown in more detail.

The welding torch 18 according to this embodiment distinguishes from the first embodiment shown in FIGS. 6 to 9 in that the nozzle-like sleeve 46 is formed separately. For instance, the nozzle-like sleeve 46 is made of a glass material that is in the substantially spherical main body 20 of the welding torch 18.

In addition, the receptacle 44 of the main body 20 is formed differently as a ring-shaped internal positioning space 72 is provided along which the nozzle-like sleeve 46 can be positioned in a certain flexible manner. For instance, the nozzle-like sleeve 46 can slide along the ring-shaped internal positioning space 72.

Accordingly, the nozzle-like sleeve 46 can slide along an axis being at least parallel to the axis of the bar-shaped welding electrode 42. In the shown embodiment, the nozzle-like sleeve 46 has a sliding axis that coincides with the axis A of the welding electrode 42.

Figure 11:
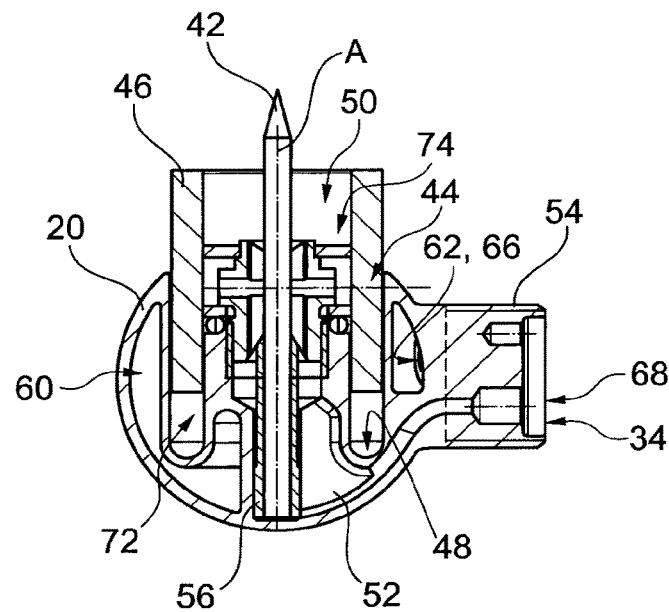
FIG. 11 shows a cross-sectional view along line A-A of FIG. 10.

In FIG. 11, the hub volume is illustrated as the nozzle-like sleeve 46 is positioned in its upper position so that the nozzle-like sleeve 46 can slide downwards until it abuts the end of the ring-shaped internal positioning space 72.

In addition, a welding electrode carrier 74, for instance a disk-shaped one, is provided that is located inside the receptacle 44. The welding electrode carrier 74 may comprise further components, for instance a guiding member supporting the welding electrode 42 laterally.

The welding electrode carrier 74 ensures that the welding electrode 42 is located positioned correctly with regard to the spherical main body 20.

In both embodiments shown, the receptacle 44 is surrounded by the cooling chamber 60 in a substantially circular manner, in particular in a cross-sectional view being perpendicular to the orientation of the welding electrode 42, so that the cooling capability of the welding torch 18 is maximized.

Both embodiments also provide that the gas supply channel 52 is in fluid communication with the receptacle 44 in which the respective nozzle-like sleeve 46 is inserted which surrounds an internal space 50 into which the welding gas flows and which accommodates the welding electrode 42.

In general, the nozzle-like sleeve 46 ensures that the welding gas is forwarded to the welding area, namely the weld pool, with pre-defined characteristics. For instance, the speed of the welding gas is increased due to the nozzle-like sleeve 46.

In both embodiments, the cooling capability is increased due to the specifically shaped integrated coolant chamber 60.

This can be ensured while manufacturing the substantially spherical main body 20 additively, in particular by using an additive manufacturing process.

This ensures that the integrated structures of the substantially spherical main body 20, namely the integrated coolant chamber 60 having a maximized volume with regard to the overall size of the welding torch 18 as well as the integrated gas supply channel 52 can be established in an optimized manner with regard to the gas supply capability or rather the cooling capability of the welding torch 18.

The torch bracket 16 as well as the camera adapter 14 may also be established by an additive manufacturing process.

This ensures that spare parts as components of the welding system 10 can also be manufactured easily and in a cost-efficient manner.

Figure 12:
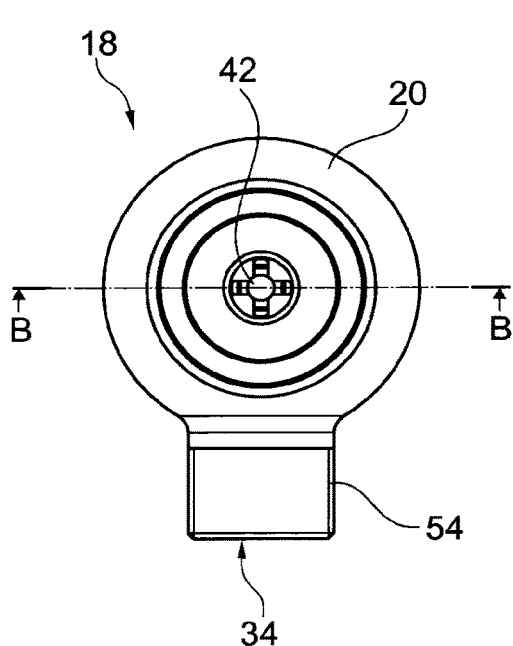
FIG. 12 shows a top view on the welding torch shown in FIG. 10.
Figure 13:
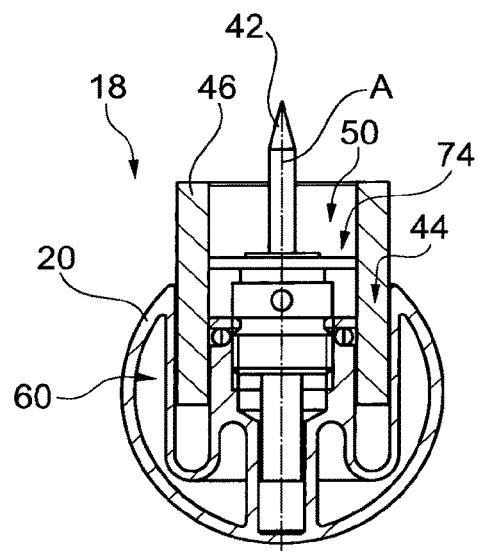
FIG. 13 shows a partial cross-sectional view along line B-B of FIG. 12.

In FIG. 13, a partial cross-sectional view along line B-B of FIG. 12 is shown wherein inter alia the welding electrode 42, the clamping sleeve 56 and the welding electrode carrier 74 are not shown in a cross-sectional view for reasons of simplicity.

These components, namely the welding electrode 42, the clamping sleeve 56 and the welding electrode carrier 74, are shown in FIG. 11 in a cross-sectional view.

The respective components may be rotationally symmetric. This may also apply for the embodiment shown in FIGS. 6 to 9.

Figure 14:
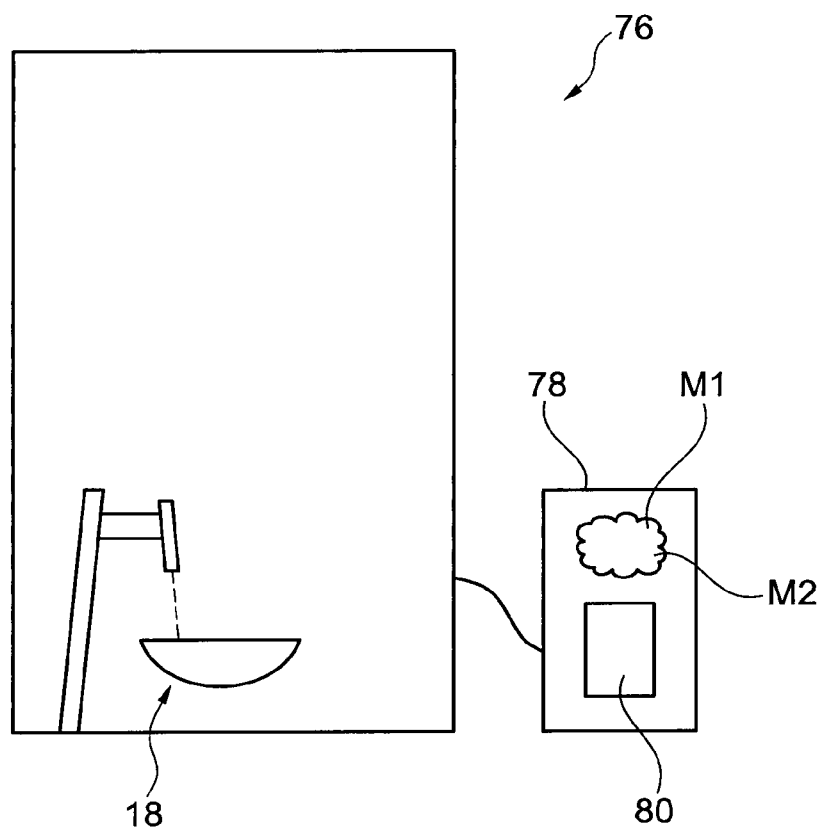
FIG. 14 shows an overview illustrating a method of producing a welding torch according to an embodiment of the present disclosure while using a computer-readable medium according to the present disclosure.
Figure 14:
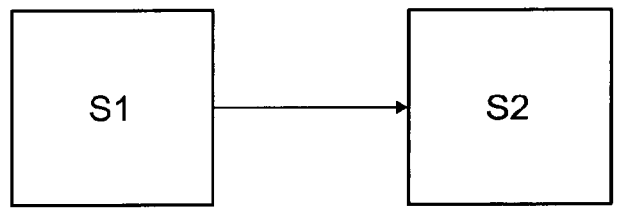

In FIG. 14, an overview is shown that illustrates a method of producing a welding torch 18 with a substantially spherical main body 20 that has an integrated coolant chamber 60.

In a first step (step S1), an adaptive manufacturing device 76 is provided, for instance a 3D printer.

Then, the additive manufacturing device 76, for instance the 3D printer, is controlled to produce the substantially spherical main body 20 of the welding torch 18 while simultaneously forming the coolant chamber 60 within the spherical main body 20 in an integral manner (step S2).

Additionally, the gas supply channel 52, the receptacle 44, the abutting surface 48 and further internal structures may be formed simultaneously when the substantially spherical main body 20 is manufactured in an additive manner.

In other words, the internal components or rather the internal structures are formed simultaneously, for instance in layers, by an additive manufacturing process while the substantially spherical main body 20 is manufactured. Hence, complex geometries may be provided that ensure best welding characteristics.

The additive manufacturing process generally ensures that the complex geometry of the substantially spherical main body 20 of the welding torch 18 can be achieved so that the volume of the integrated coolant chamber 60 is maximized simultaneously.

Moreover, a computer-readable medium M1 may be provided that has computer-executable instructions adapted to cause an additive manufacturing device 76 to produce additively at least the welding torch 18 as described above.

The computer-readable medium M1 may be used by the additive manufacturing device 76 that has at least a processor or rather a computer 78 which can execute the respective computer-executable instructions so that the welding torch 18. In addition, the additive manufacturing device 76 may have a memory 80 with which the computer-readable medium M1 may interact.

The computer-readable medium M1 may also comprise computer-executable instructions adapted to cause the additive manufacturing device 76 to produce additively the other components of the welding system 10, for instance the torch bracket 16, the camera adapter 14 and/or the holder 12.

Moreover, another computer-readable medium M2 may be provided that has computer-executable instructions adapted to cause an additive manufacturing device 76 to produce the substantially spherical main body 20 of the welding torch 18 while simultaneously forming the coolant chamber 60 in the substantially spherical main body 20 in an integral manner.

Therefore, the welding torch 18 may be produced according to a computer-readable medium M1, M2 having the respective computer-executable instructions that are executed appropriately.

The substantially spherical main body 20 may be made of metal and/or coated with an electrically isolating material. The metal material ensures the high thermal conductivity ensuring good cooling capabilities. The electrically isolating material improves the resistance with regard to electrical flashovers wherein the respective resistance is already improved due to the shape of the welding torch 18, namely the substantially spherical shape of the main body 20.

In fact, the main body 20 deviates from a perfect sphere only due to the extension 54 that provides the interface area 34 as well as an opening area assigned to the welding electrode 42.

In general, the welding torch 18 having the spherical main body 20 being part of the ball joint 24 while acting as the joint head 22 that interacts with the torch bracket 16 ensures that the orientation of the welding torch 18, in particular the one of the welding electrode 42, can be set easily.

In fact, the ball joint 24 ensures that the welding torch 18 may be positioned in several different positions in a freely manner so that all intended orientations can be reached by the welding system 10.

What is claimed is:

1. A welding torch for a welding system comprising:
an at least partly spherical main body having an integrated coolant chamber in fluid communication with at least one coolant port, the main body being a joint head of a ball joint of the welding system;
a welding electrode; and
a welding electrode carrier,
wherein the coolant chamber has an at least partly spherical outer area defined by an outer wall of the main body,
wherein the main body comprises a receptacle for the welding electrode,
wherein the welding electrode is inserted in the receptacle via the welding electrode carrier.

2. The welding torch according to claim 1, wherein the main body is manufactured additively by an additive manufacturing process.

3. The welding torch according to claim 2, wherein the additive manufacturing process is a 3D printing process.

4. The welding torch according to claim 1, wherein the coolant chamber has an outer wall defined by the main body.

5. The welding torch according to claim 1, further comprising at least one welding gas supply channel integrated in the main body.

6. The welding torch according to claim 1, further comprising at least one welding gas supply channel integrated in the main body, wherein the receptacle and the gas supply channel are in fluid communication.

7. The welding torch according to claim 1, wherein the receptacle is surrounded by the coolant chamber in a substantially circular manner.

8. The welding torch according to claim 1, further comprising a gas supply inlet, a coolant inlet and a coolant outlet in an interface area of the main body.

9. The welding torch according to claim 1, wherein the main body is made of a metal and/or coated with an electrically isolating material.

10. The welding torch according to claim 1, wherein the coolant chamber is between the receptacle and the outer wall.

11. The welding torch according to claim 1, wherein the main body has an inner wall, the outer wall and the inner wall defining the coolant chamber,
   the inner wall defining a receptacle for a welding electrode.

12. The welding torch according to claim 1, wherein
   the main body includes a coolant inlet formed in the main body for supplying coolant to the coolant chamber and a coolant outlet formed in the main body for removing coolant from the coolant chamber.

13. A welding system comprising:
   a torch bracket; and
   the welding torch as recited in claim 1, the torch bracket having a socket of a ball joint, the socket receiving the main body of the welding torch in a spherically orientable manner thereby forming the ball joint.

14. The welding system according to claim 13, wherein the torch bracket is manufactured additively by an additive manufacturing process.

15. The welding system according to claim 13, wherein a single connector is coupled with the welding torch.

16. The welding system according to claim 13, wherein a single connector is coupled with an interface area of the welding torch.

\* \* \* \* \*